(No Model.)
M. McNULTY.
CAR BRAKE.
No. 523,775. Patented July 31, 1894.
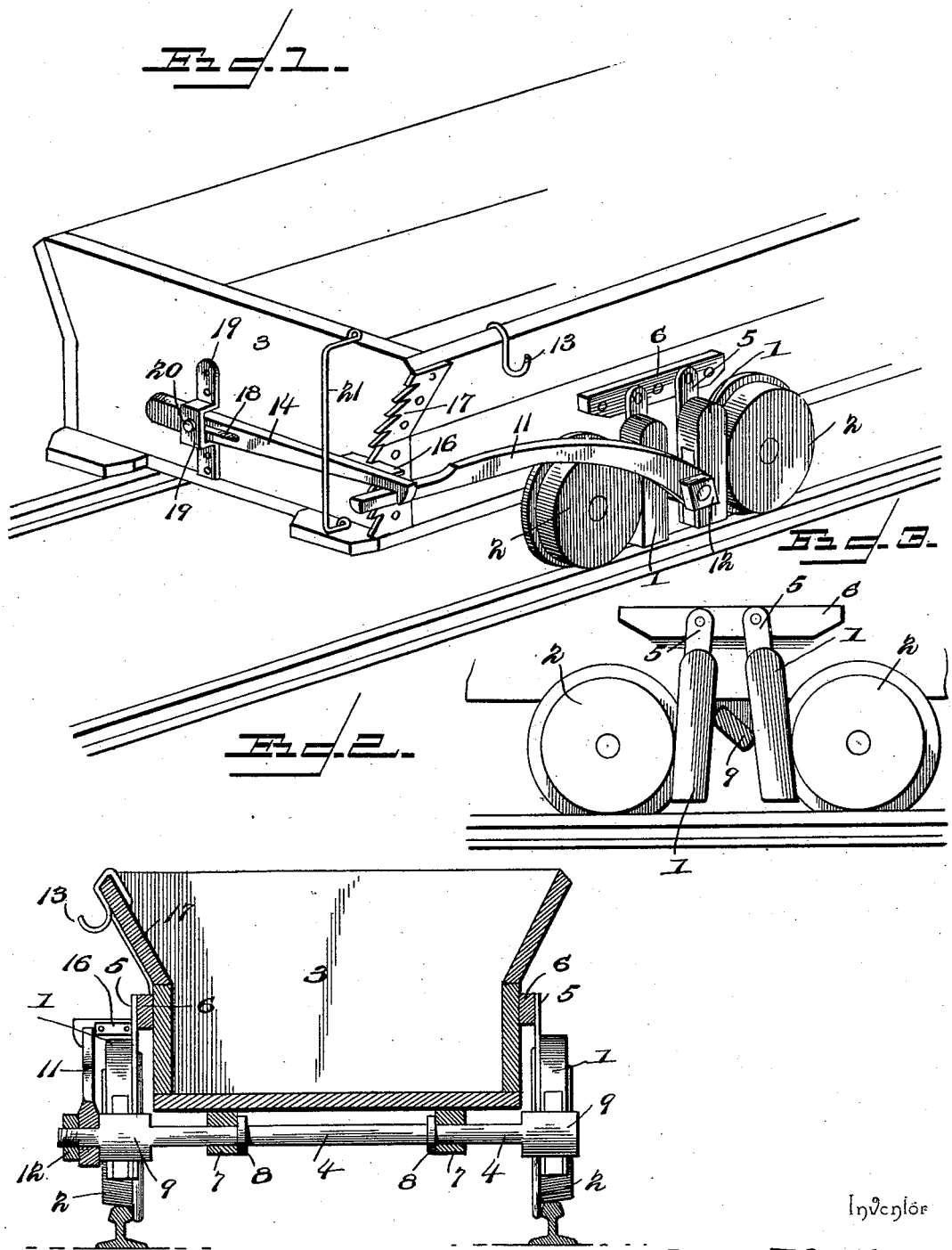
Witnesses
E. K. Stewart
N. P. Riley
Inventor
Michael McNulty
By his Attorneys.
C. A. Snow & Co.

UNITED STATES PATENT OFFICE.

MICHAEL McNULTY, OF NORTON, VIRGINIA.

CAR-BRAKE.

SPECIFICATION forming part of Letters Patent No. 523,775, dated July 31, 1894.

Application filed October 26, 1893. Serial No. 489,181. (No model.)

*To all whom it may concern:*

Be it known that I, MICHAEL MCNULTY, a citizen of the United States, residing at Norton, in the county of Wise and State of Virginia, have invented a new and useful Car-Brake, of which the following is a specification.

The invention relates to improvements in brakes.

The object of the present invention is to improve the construction of car brakes, and to provide a simple and inexpensive one, which may be readily applied with great force.

The invention consists in the construction and novel combination and arrangement of parts hereinafter fully described, illustrated in the accompanying drawings and pointed out in the claims hereto appended.

In the drawings—Figure 1 is a perspective view of a car provided with a brake constructed in accordance with this invention, the brake being applied. Fig. 2 is a transverse sectional view. Fig. 3 is a detail sectional view showing the brake shoes and the shaft.

Like numerals of reference indicate corresponding parts in all the figures of the drawings.

1—1 designate brake shoes, arranged in pairs between wheels 2 of a car 3 and pivotally or hingedly suspended from the latter and adapted to be forced apart and in contact with the wheels by a transverse shaft 4. The brake shoes 1 are arranged at each side of the car and are provided at their tops with upwardly extending plates 5, which are pivoted to a cleat 6 secured to the body 3 of the car.

The transverse shaft is journaled in bearings 7 and is provided with flanges or collars 8 to prevent longitudinal movement, and it is provided at its ends with enlargements or heads 9 arranged vertically between the pairs of brake shoes, and adapted to be turned into engagement with the latter to force the same against the wheel, whereby the brake is applied with great force. One end of the shaft 4 is provided with a squared or polygonal portion to receive a lever 11, which is provided at its lower end with a similar opening, and which is secured on the shaft by a nut 12 engaging a threaded portion of the shaft at the outer terminus of the squared or polygonal portion. The lever is held elevated to prevent an application of the brake by a hook 13; and is securely held when the brake is applied by a locking bar 14 arranged on one end of the car and provided at its outer end with a lug or hook 15 and having a flange 16 formed by a plate and adapted to engage a ratchet 17 of the car. The inner end of the locking bar 14 is provided with a longitudinal slot 18 and is arranged in a keeper 19, and is engaged by a fastening device 20, such as a bolt, screw or the like, which is arranged at the center of the keeper, and which passes through the slot 18. The locking bar is capable of a vertical swinging movement in order to engage any of the teeth of the ratchet for securing the brake-lever at any desired position; and the locking bar is capable of a limited longitudinal movement in order to engage and disengage the upper end of the brake-lever. The outer end of the locking bar is arranged in a vertical guard 21 secured to the adjacent end of the car.

It will be readily apparent that the brake is simple and comparatively inexpensive in construction, that it is positive in its operation, and that it is capable of exerting great pressure upon the wheels of a car.

The brake shoes may be of any desired construction; and I desire it to be understood that changes in the form, proportion and the minor details of construction may be resorted to without departing from the principle or sacrificing any of the advantages of this invention.

What I claim is—

1. In a brake, the combination of a car, a pair of brake shoes arranged adjacent to each other and located between the wheels of a car and adapted to be spread apart to engage the wheels, a brake lever, a shaft journaled on the car and provided with a head located between the brake shoes, said shaft having the brake lever secured to it and adapted to be turned by the same, a ratchet mounted on the car, a pivotally mounted locking bar mounted on the car and having a limited longitudinal movement and arranged to engage the brake lever and the ratchet, substantially as described.

2. In a brake, the combination of a car, brake shoes arranged in pairs between the wheels thereof, a transverse shaft journaled on the car and provided with heads located between the brake-shoes for spreading the same, a brake lever secured to the shaft, a ratchet mounted on the car, a keeper arranged on the car and provided with a central fastening device, and a locking bar arranged in the keeper and provided with a longitudinal slot to receive the central fastening device and having its outer end engaging the ratchet and adapted to engage the brake lever, substantially as described.

In testimony that I claim the foregoing as my own I have hereto affixed my signature in the presence of two witnesses.

MICHAEL McNULTY.

Witnesses:
M. T. WHITAKER,
J. F. ALLEY.